Patented Sept. 13, 1932

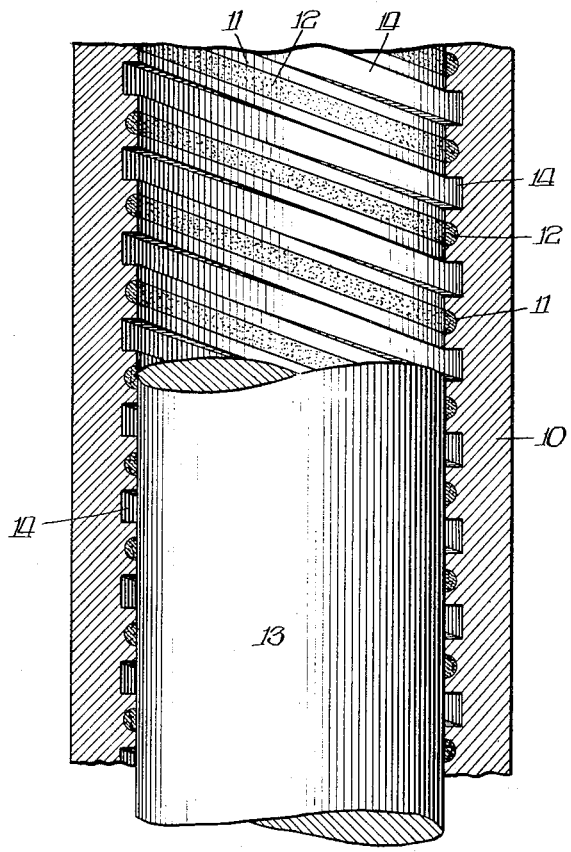

1,877,495

UNITED STATES PATENT OFFICE

WILLIAM H. CATER, OF CHICAGO, ILLINOIS

BEARING

Application filed May 15, 1931. Serial No. 537,529.

My invention relates or pertains to bearings for rotating or revolving shafts and concerns more particularly, but not necessarily exclusively, bearings for the shafts which drive or operate pumps at the bottoms of wells.

In water and other wells, the liquids of which are raised or elevated by pumps in the lower portions of the wells, and which require that their upright shafts shall extend down to such lower levels, difficulty has heretofore been experienced in providing suitable bearings for the shafts, because the foreign matter present in the liquid, such as dirt, grit, sand, etc., finds its way into the bearings and causes excessive wear.

One aim and prime purpose of this invention is to supply an improved form and style of bearing which will have adequate lubrication and which has means for eliminating or greatly reducing the undue wear heretofore caused by the presence of such dirt or grit.

To the accomplishment of such highly desirable and other objects, the novel and improved bearing is supplied internally with a spiral or helical groove filled with any kind of suitable lubricating material, such as graphite, and also with an empty, parallel, helical or spiral groove.

Any dirt or sand or other abradant which tends to enter the bearing with the liquid easily finds its way into the spiral groove.

If, after having entered such helical channel, it is out of contact with the revolving shaft in the bearing, even though the associated liquid more or less fills the groove, it may remain in such position at least temporarily and consequently does no harm, but, if it ultimately or subsequently contacts with or touches the shaft, the rotation of the latter carries it along up or down the screw-shaped duct, depending upon the direction of rotation of the shaft, with its final discharge from the end of the bearing.

In this manner, in the improved bearing the detrimental wearing and grinding action of the foreign matter is in large measure or completely overcome or surmounted, and the shaft is adequately lubricated by the embedded graphite and possibly in part by the liquid in the other groove.

Also in this structure, such grit or sand by the employment of the spiral canal or furrow is prevented from coming into contact with the embedded lubricant in the parallel groove, and it is consequently precluded from interfering with the efficient performance of the required function of such lubricant.

To enable those acquainted with this art to understand the invention fully and the benefits which accrue from its employment, in the accompanying drawing, forming a part of this specification, a present, preferred embodiment of the invention has been presented in detail.

The single view of the drawing shows the new bearing in central, vertical, longitudinal section, and it illustrates a portion only of the pump-driving shaft which rotates or revolves in such bearing.

Referring to this drawing, it will be noted that the vertically-arranged bearing 10 of any suitable or desirable metal has an internal, spiral groove 11 filled with any appropriate lubricating material 12, such as graphite or any proper compound.

Such filler affords efficient lubrication for the power-driven, pump-operating shaft 13 which revolves in the bearing in direct contact with its inner surface and its incorporated lubricating material.

The bearing on its inside also has an empty or unoccupied helical groove or conduit 14 provided for the specified purpose of accommodating any liquid and effecting the downward or upward advance or progress of any foreign matter which tends to enter the bearing either from above or below, such dirt or grit after passing into the channel being fed along therein if it contacts with the revolving shaft, or by reason of its immersion in the liquid in the channel, the direction of rotation of the shaft with relation to the pitch or inclination of the groove being such as to produce the desired direction of movement or progress of the groove's contents.

The provision of such means for the accommodation of the liquid and its foreign matter prevents it from injuring or damaging the bearing or shaft and causes its final expulsion from the end of the bearing.

Stated somewhat differently, the liquid and its contained grit or dirt are permitted to travel through the bearing member without causing any harm to the mechanical elements involved.

The invention as set forth in the appended claim is susceptible of a variety of embodiments in satisfactory physical form and it is, therefore, not limited or restricted to the precise and exact details of structure shown and described, and more or less modification or changes in the construction may be resorted to without the loss or sacrifice of any of its outstanding or material benefits.

I claim:

A bearing-member having an internal cylindrical bearing surface adapted to accommodate a rotary shaft, said surface having an empty spiral channel open at the two ends of the bearing and a second spiral groove the convolutions of which are between the convolutions of said first channel and filled with a lubricating material.

In witness whereof I have hereunto set my hand.

WILLIAM H. CATER.